United States Patent [19]

McLaughlin et al.

[11] 4,272,757

[45] Jun. 9, 1981

[54] VENDING MACHINE ACCOUNTABILITY SYSTEM

[75] Inventors: Donald L. McLaughlin, Newtown Square; Elwood E. Barnes, Parkesburg, both of Pa.

[73] Assignee: Mars, Incorporated, McLean, Va.

[21] Appl. No.: 27,377

[22] Filed: Apr. 5, 1979

[51] Int. Cl.³ .......................... H04Q 9/00; G06F 7/00; G06M 3/12; G07D 9/00

[52] U.S. Cl. ................................ 340/152 R; 194/1 N; 235/92 AC; 235/92 CN

[58] Field of Search ............ 340/152 R, 149 R, 147 A; 235/92 FL, 381, 383, 385, 92 AC, 92 CN, 92 CT; 364/401, 403, 406, 479

[56] References Cited

U.S. PATENT DOCUMENTS

| | | | |
|---|---|---|---|
| 3,120,602 | 2/1964 | Lagarde | 235/92 R |
| 3,436,530 | 4/1969 | Faude et al. | 235/92 CT |
| 3,551,652 | 12/1970 | Faude | 235/92 R |
| 3,754,122 | 8/1973 | Dinapoli et al. | 235/92 DN |
| 3,757,089 | 9/1973 | Hockler | 340/149 A |
| 3,779,357 | 12/1973 | Haller et al. | 235/92 FL |
| 3,786,960 | 1/1974 | Young | 235/92 FL |
| 3,878,371 | 4/1975 | Burke | 235/92 PD |
| 3,934,123 | 1/1976 | Maurer et al. | 235/92 PD |
| 3,959,632 | 5/1976 | Trehn et al. | 235/92 AC |
| 3,985,217 | 10/1976 | Kortenhaus et al. | 340/162 |
| 4,007,355 | 2/1977 | Moreno | 340/149 A |
| 4,038,525 | 7/1977 | Freeman | 235/92 CN |
| 4,072,930 | 2/1978 | Lucero et al. | 340/152 T |
| 4,096,933 | 6/1978 | Massa | 364/479 X |
| 4,099,722 | 7/1978 | Rodesch et al. | 340/635 |
| 4,103,289 | 7/1978 | Kolber | 340/149 A |
| 4,146,778 | 3/1979 | Wain | 235/92 AC |
| 4,180,206 | 12/1979 | Takahashi et al. | 235/419 |

FOREIGN PATENT DOCUMENTS 1470813 4/1977 United Kingdom .

*Primary Examiner*—Donald J. Yusko

*Attorney, Agent, or Firm*—Davis, Hoxie, Faithfull & Hapgood

[57] ABSTRACT

An accountability system for a vending machine system having means for vending products and means for determining credit, the accountability system comprising a portable electronic data file module which is removable from the system, and means for collecting transaction data from the vending machine system and recording it in the portable electronic data file module. A module interlock and a power monitor are provided to ensure that accurate information is stored in the module.

6 Claims, 9 Drawing Figures

VENDING MACHINE ACCOUNTABILITY SYSTEM

In recent years, vending machines have become increasingly complex. Now, a large variety of products at a variety of prices can be dispensed by a single vending system or machine. In addition to coins, banknotes and credit cards can be used to obtain credit for a purchase in some systems. As a result of the increasing capabilities of such machines, the increasing cost of labor and the increasing value of products vended, vending machine management has become more complex.

Our vending machine accountability system provides a means for simplifying the management of single price and multiprice vending machines, identifying machines subject to frequent tampering and reducing the temptation of pilferage by the personnel responsible for the operation of the machines. A small electronic portable data file module is connected in each machine to record data concerning the machine's transactions. Such data is produced by the vending system's means for selecting products and by its means for determining credit, for example, a coin mechanism. The operator periodically removes and replaces the module. The removed module is returned to a central location where its contents can be displayed or read directly into a data processing system. In preferred embodiments of our invention, an interlock and a power monitor are provided to reduce the possibility of tampering with the vending machine and the contents of the module.

Further information concerning the objects of our invention, and its structure and manner of operation will be found in the detailed description below.

The component values and voltages shown in the figures and mentioned herein are illustrative, and our invention is not limited to the particular component values and voltages mentioned herein. Similarly, where we have referred to wires, leads and buses connecting the various elements, it will be clear to those skilled in the art where alternative data communcations means such as fiber optics or muliplexed signals on a smaller number of wires can be substituted.

Figure 1:
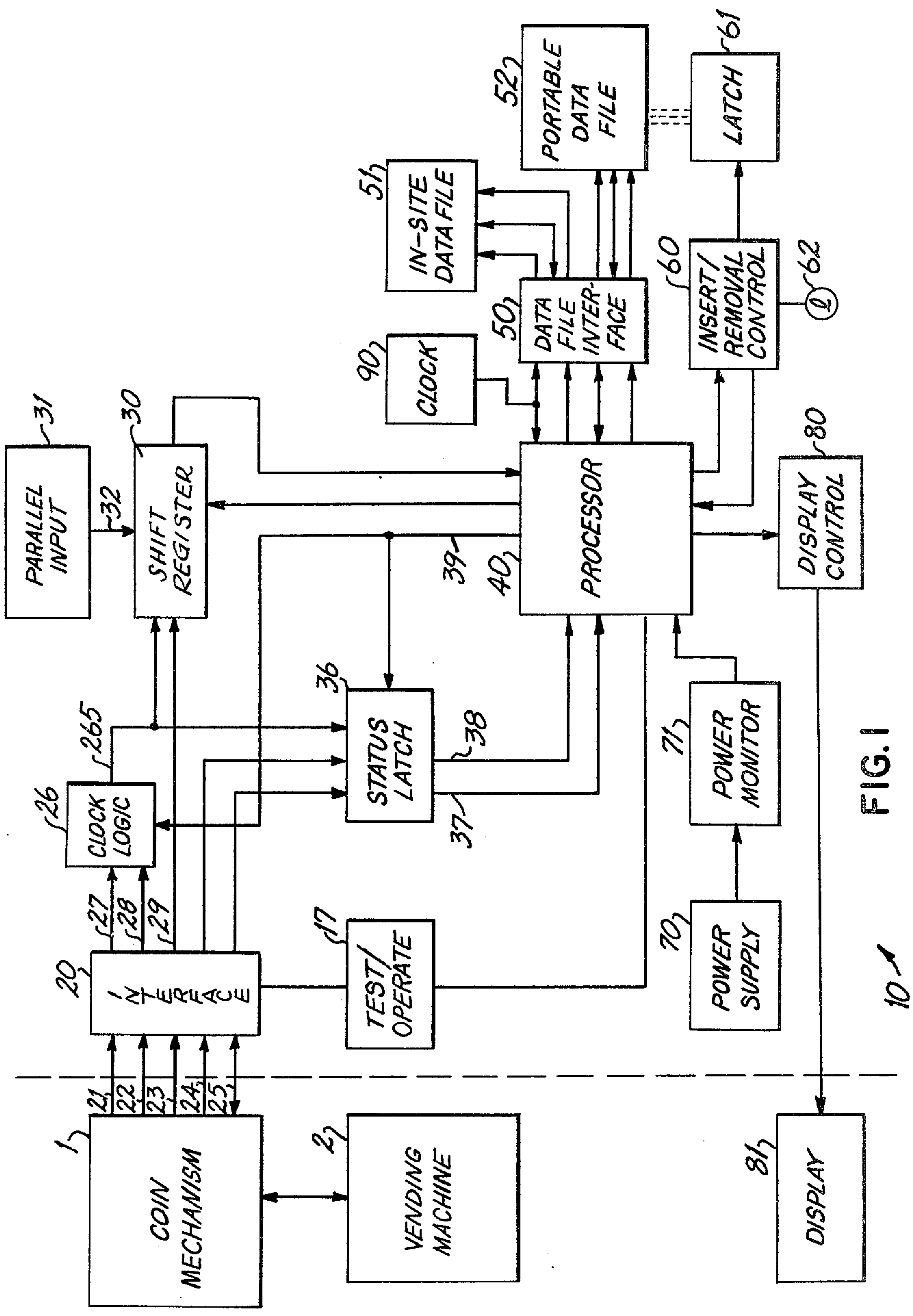
FIG. 1 is a schematic block diagram of a first embodiment of our invention.

FIG. 1 shows a basic vending machine accountability system 10 in accordance with my invention. The figure shows an accountability system interface 20, a clock logic circuit 26, a shift register 30, a parallel input circuit 31, a microprocessor 40, a status latch circuit 36, a data file interface 50, an in-site data file 51, a portable data file module 52, a portable data file insert/removal control circuit 60, an insert/removal latch 61, a clock circuit 90, a power supply 70 and a power supply monitor 71, a display interface 80 and a display 81, and a test/operate switch 17.

The accountability system 10 is connected by the accountability system interface 20 to a coin mechanism 1 through several wires 21–25. In this particular embodiment, the accountability system 10 and the accountability system interface 20 are designed to connect with coin mechanisms such as any of MARS Electronic (trademark) coin mechanism model Nos. 500, 504, 540, 544 and 604.

In this embodiment, the coin mechanism 1 performs the usual functions of examination, validation, acceptance and routing of coins to the appropriate storage location. Each time a coin is accepted, the additional value of the coin is recorded in the coin mechanism's credit accumulator in the known fashion.

The coin mechanism 1 functions as the interface between the vending machine 2 and the accountability system 10. When a product selection switch on the vending machine 2 is actuated by a user, a vend request is transmitted to the coin mechanism 1. The coin mechanism 1 compares the price for that selection with the stored credit value of credit accumulated by the current user. If adequate credit exists and necessary change is available, a vend is authorized and product delivery is begun. The vending machine 2 transmits a vend-in-progress (blocker) signal to the coin mechanism 1 to indicate that the vend is actually proceeding. The vend-in-process signal causes the coin mechanism 1 to generate an Escrow Accept (EA) signal, which terminates the vend, begins the dispensing of change, cancels the credit, and returns the coin mechanism to the recognition state in which coins can be accepted. Alternatively, the coin mechanism 1 may operate in a "multi-vend" mode in which receipt of the EA signal terminates the current vend, but change making and credit cancellation do not occur automatically. Instead, the value in the credit accumulator is reduced by the price for the vend and the system returns to the recognition state in which more coins may be deposited, a new vend may be requested, or an Escrow Return request (ER) may be made. In this type of coin mechanism, a series of vend requests may occur and the coin mechanism will respond to each request as long as the accumulated credit is adequate.

In the embodiment of FIG. 1, wires 21 and 22 carry clock pulses from the coin mechanism 1 to the accountability system interface 20. Wire 23 carries transaction data from the coin mechanism 1. Wires 24 carries the Escrow Accept (EA) signal from the coin mechanism 1. Wire 25 carries an Vending Machine Inhibit (VMI) signal to the coin mechanism 1 and the Escrow Request (ER) signal from the coin mechanism 1.

The clock signals from the interface 20 on wires 27 & 28 are transmitted to clock logic circuit 26, which provides logic signals to the shift register 30 and the status latch circuit 36. The interface 20 also transmits the data from the coin mechanism 1 to the shift register 30. An alternative source of data for the shift register 30, is the parallel input circuit 31, such as a a plurality of switches, which is connected to the shift register 30 by a 16 bit parallel bus 32. Data from the shift register 30 is transmitted to a microprocessor 40 which manages the accountability system 10. The status latch circuit 36 has two outputs 37 & 38 which provides control signals to the microprocessor 40. These status latch signals are derived from the signals from the coin mechanism 1.

The microprocessor 40 is connected to an in-site data file 51 and a portable data file module 52 via a data file interface 50. The removal of the module 52 is controlled by the microprocessor 40 via an insert/removal control circuit 60 and a electro-mechanical latch 61, such as a solenoid.

In order to assure that the accountability functions of the accountability system 10 are not defeated by a power failure or intentional interruption of power, the power supply 70 has a short term power reserve and the power monitor 71 determines when a power failure has occurred and notifies the microprocessor 40 to record the necessary information in one of the data files 51 or 52 before the reserve power is consumed. In this embodiment, this information is stored in the in-site data file 51.

the accountability system 10 is also provided with a credit display interface 80 for providing the necessary signals to control a credit display 81, such as a three digit light-emitting diode display. The credit display 81 is changed as each coin is accepted and following each authorization of vending or escrow return to reflect the current credit available to the machine user.

Figure 2:
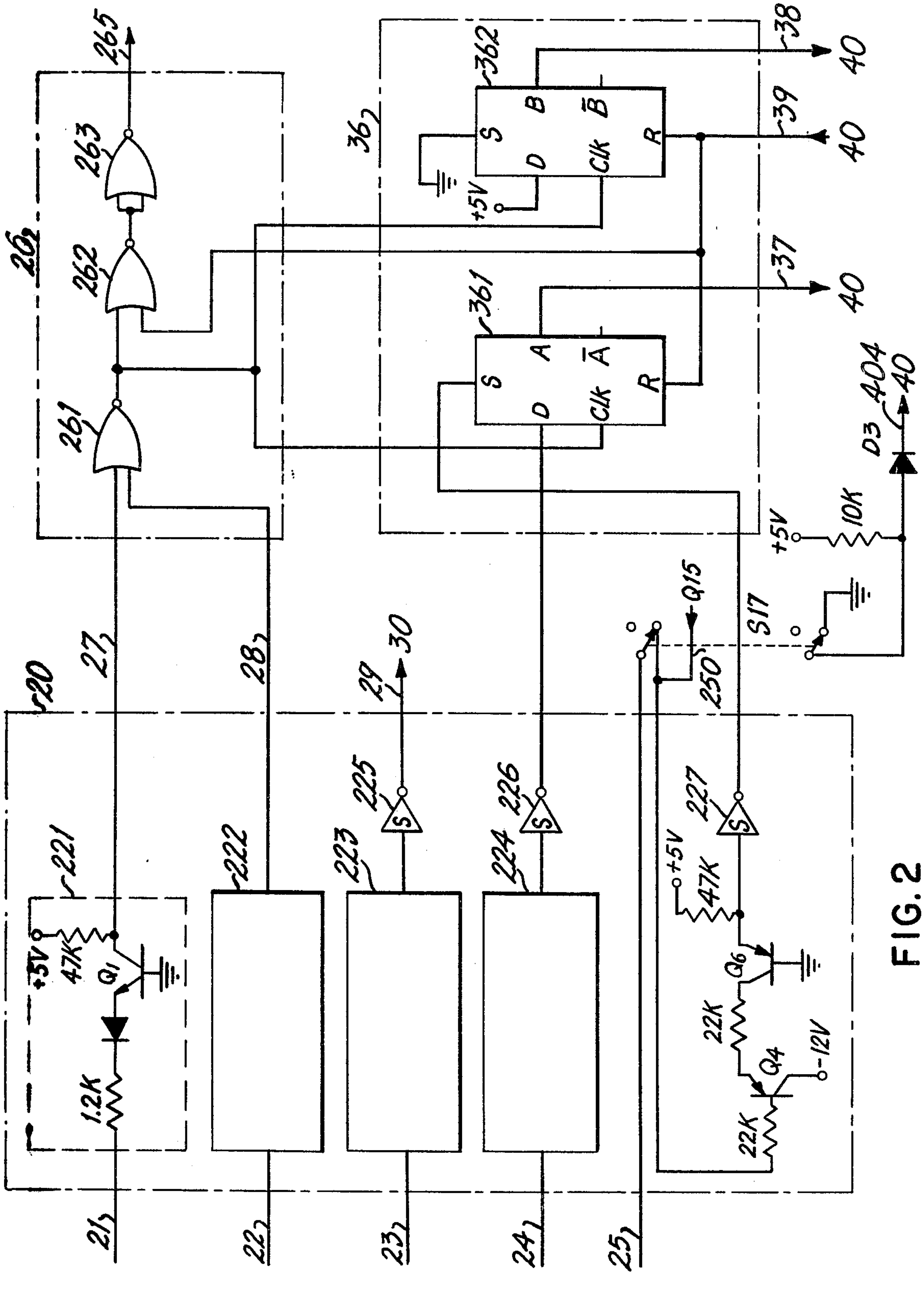
FIG. 2 is a schematic block diagram of an accountability system interface, a clock logic circuit and a status latch circuit suitable for the embodiment of FIG. 1.

FIG. 2 shows details of the accountability system interface 20, the clock logic circuit 26 and the status latch circuit 36 of the accountability system 10. The accountability system interface 20 in accordance with this embodiment includes four similar input drivers 221, 222, 223 and 224 connected to wires 21, 22, 23 and 24 respectively. As shown in detail in the case of input driver 221, a 1.2 K resistor in series with a diode connects the input wire to the emitter of a grounded base transistor Q1. The transistor's collector is connected by a 47 K load resistor to a +5 volt DC power supply and provides the output of input driver 221. The other input drivers 222–224 include the same circuit as input driver 221.

The accountability system interface 20 circuit associated with the data transmission wire 23 also includes an inverter 225 at the output of the input driver 223. As indicated by the letter "S" on the inverter 225 in FIG. 2, Schmidt trigger circuits (such as one section of a RCA type No. 40106) are employed as the inverter here and elsewhere in this embodiment to provide relatively clean, noise-free digital signals. In the case of the the escrow accept (EA) signal from wire 24, the output of the input driver 224 is also inverted by a Schmidt trigger circuit inverter 226.

Transmission of signals from the coin mechanism 1 on wires 21, 22 and 23 will occur under two possible operating conditions of the coin mechanism 1:

(a) Each time a coin is accepted, and the value in the credit accumulator is increased by the value of the coin; and (b) Each time a vend is completed and the value stored in the credit assumulator is decreased by the price the vend.

Signals appearing on wires 24 and 25 from the coin mechanism 1 are used to define two different events:

(a) The Escrow Accept (EA) signal on wire 24 indicates a successfully completed vend. If the EA signal is still preset when clock and data signals are transmitted wires 21, 22 and 23, a normal vend has occurred. If the EA signal has disappeared before clock and data signals occur a "multi-vend" mode is in effect.

(b) The Escrow Return (ER) signal from the coin mechanism 1 on wire 25 occurs whenever a Escrow Return request has been honored by the coin mechanism 1. This action results in the return of all deposited coins and a cancellation of credit by the coin mechanism 1. No clock or data signals will appear on wires 21, 22 and 23 as a result of this activity. Wire 25 is also used to transmit the vending machine inhibit (VMI) signal to the coin mechanism 1.

Figure 7:
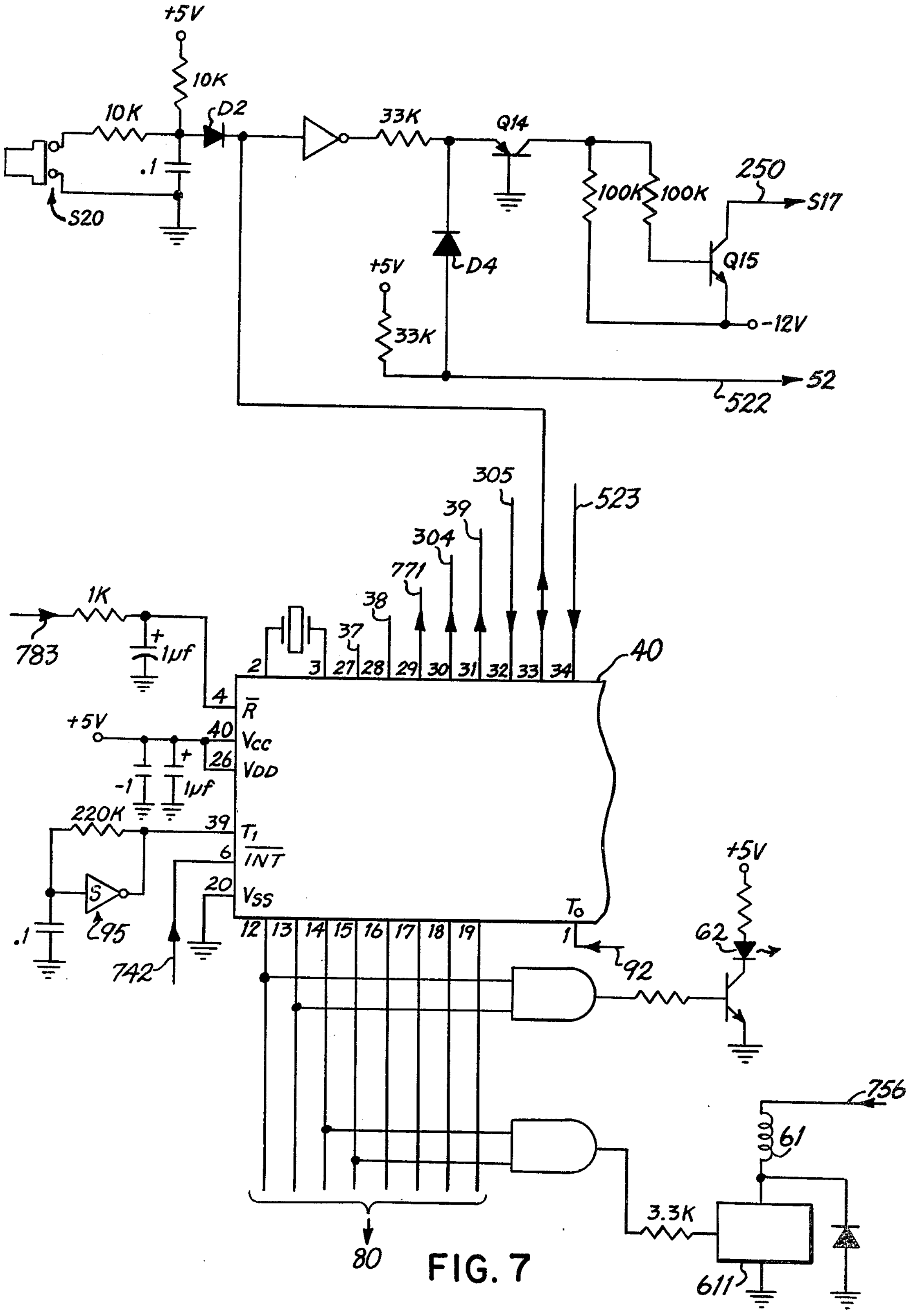
FIG. 7 is a schematic block diagram of a portion of an insert/removal interlock control circuit suitable for controlling the insertion and removal of the portable data file module in the embodiment of FIG. 1.

The accountability system interface 20 passes the ER and vending machine inhibit (VMI) signals on wire 25 directly to or from the coin mechanism 1 through the accountability system interface 20 to one section of the test-operate switch S17. In FIG. 2, this switch S17 is shown in the Operate position, connecting the ER signal on wire 25 to the input driver circuit including transistors Q4 and Q6, and the Schmidt trigger circuit inverter 227. Wire 25 is also connected by switch S17 to receive the VMI signal from transistor Q15, which is shown in FIG. 7 and discussed below in connection with that figure. When the test/operate switch S17 is placed in the Test position, wire 25 is disconnected from its input driver and transistor Q15, disabling the ER and VMI functions.

The status latch circuit 36 monitors the operating modes of the coin mechanism 1. The two latches are "D" type flip-flops 361 and 362. Flip-flop 362 will be set ("1") whenever the clock logic 26 detects the concurrent appearance of seven pulses on both clock lines 21 and 22. Under the same condition, flip-flop 361 will be set ("1") or reset ("0") depending upon the presence or absence of the EA signal at the time the pulses are generated by the clock logic 26. Receipt of the ER signal causes flip-flop 361 to be set ("1") and leaves flip-flop 362 in the rest ("0") state. The truth table for the logic described is as follows:

| 361 | 362 | Operating Mode |
|---|---|---|
| 0 | 0 | No Activity |
| 0 | 1 | Multi-vend or Coin Acceptance |
| 1 | 0 | Escrow Return |
| 1 | 1 | Normal Vend |

The output signals from each flip-flop 361 & 362 are supplied as status bits (A and B) to pins 27, 28 of the microprocessor 40.

The signals on wires 21, 22 and 23, carrying the two clock signals and the data signal are supplied by the coin mechanism 1 to indicate to the accountability system 10 that a value is stored in the coin mechanism's credit accumulator. Corresponding buffered signals appear at the output of the accountability system interface 20 on wires 27, 28 and 29, respectively. When a series of seven pulses appears simultaneously on wires 27 and 28; a binary coded NRZ signal indicative of the value in the credit accumulator is transmitted on the data wire 29.

The clock logic 26 provides ANDing functions for these clock signals. NOR gate 261 (such as a section of a RCA type No. 4001) ANDs the two clock signals received from the coin mechanism 1 via input drivers 221 and 222. The resulting clock signal from clock logic 26 is supplied to the clock inputs of the flip-flops 361 and 362 in the status latch circuit 36, and to one input of NOR gate 262 where the clock signal is ANDed with the shift register read enable signal produced at pin 31 of the microprocessor 40. In this embodiment, NOR gate 263 is used simply as an inverter to provide the proper polarity pulse to the clock input of the shift register 30.

Figure 3:
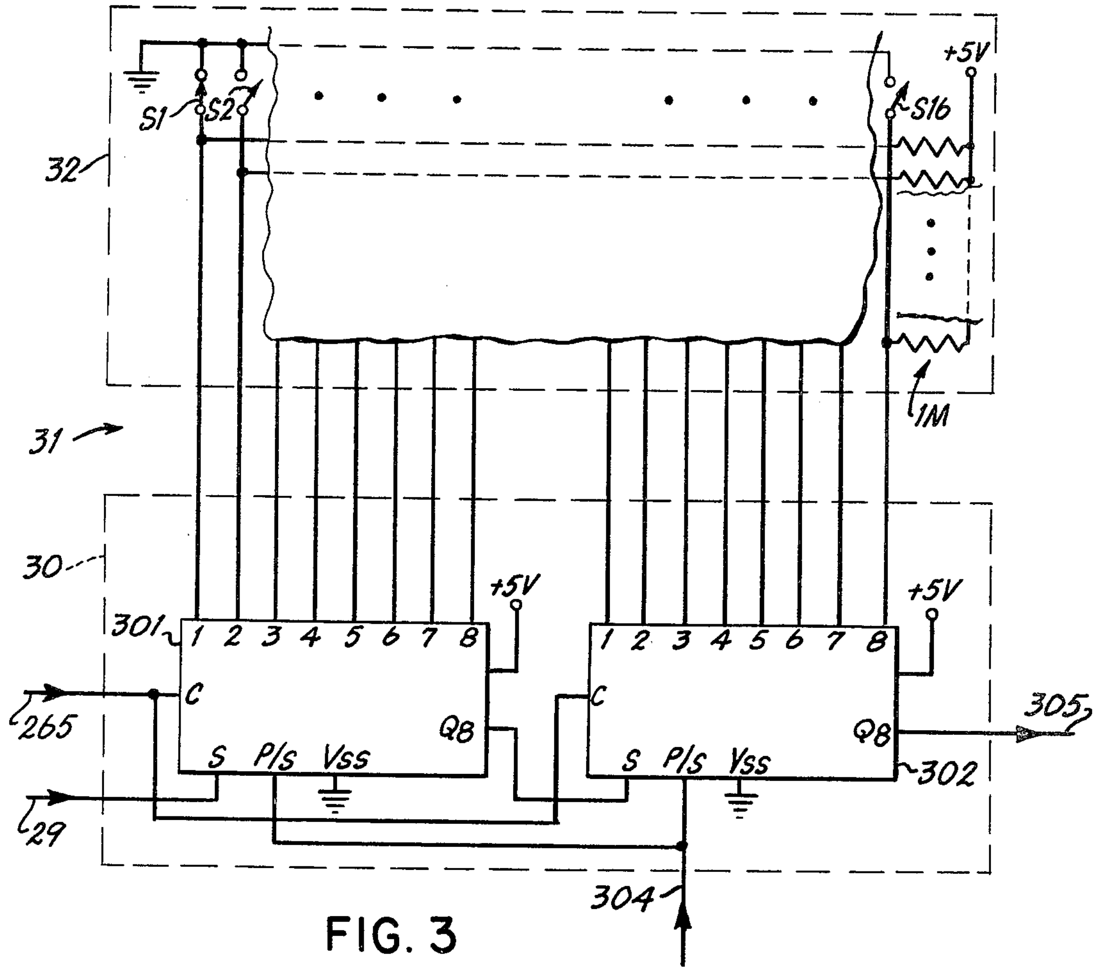
FIG. 3 is a schematic block diagram of a shift register and a parallel input circuit suitable for the embodiment of FIG. 1.

The shift register 30, shown in FIG. 3, is of the parallel-in, serial-in, serial-out variety. As shown in FIG. 3, it comprises a pair of RCA typ No. 4014 shift registers 301 and 302. The clock signal pulses on wire 265 are used to serially shift the NRZ data signal appearing on the wire 29 into the serial input of the first shift register 301. Data can also be loaded into the register 30 in parallel from the parallel input circuit 31, which in this embodiment is a plurality of switches S1-S16, each capable of applying either ground potential or +5 Volts (via a one megohm resistor) to a parallel input of the shift registers 301 & 302. The parallel input is employed to manually input such data as the machine identification number. Data inputted either serially or in parallel can be shifted out serially under the control of the microprocessor 40.

Figure 4:
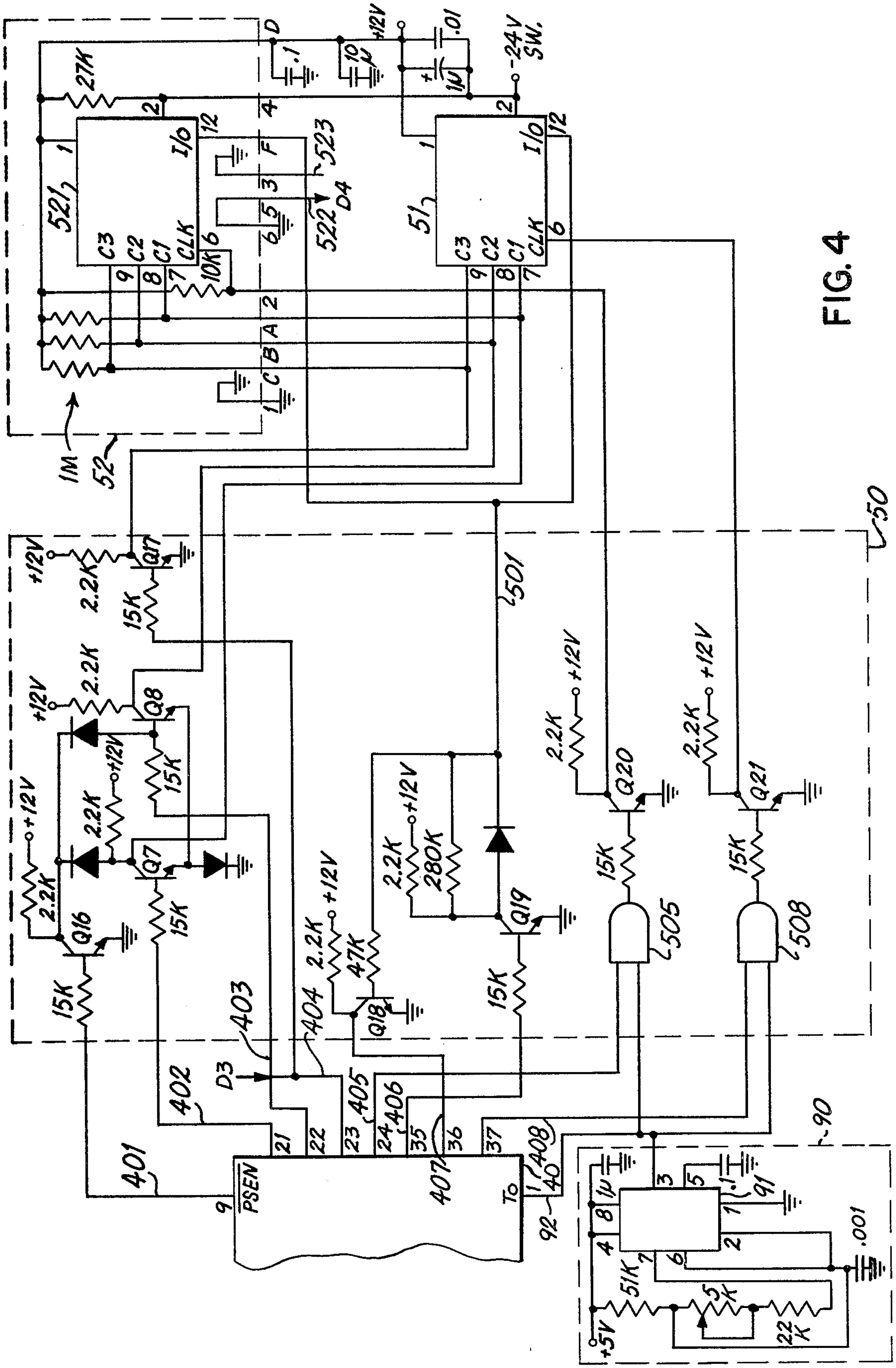
FIG. 4 is a schematic block diagram of a clock circuit, a portable data file module, an in-site data file and a portion of the microprocessor suitable for the embodiment of FIG. 1.

The microprocessor 40 (such as an Intel type No. 8049), shown in FIGS. 1, 4 and 7, acts as the central control element for the accountability system 10 and performs the following functions:

(a) monitors the activities of the vending machine 2 and coin mechanism 1, (b) generates correctly encoded data and drive signals for a credit display 81, (c) causes data generated during a specific vending period to be stored in the memory of the portable data file module 52, (d) Causes the storage in the in-site data file 51 of a continuous data record describing the vending operation, (e) Controls the insertion or removal of the portable data file module 52 by the vending machine route operator, (f) Provides a status display on indicator 62 to indicate the operating condition of the system, (g) Enables or disables the operation of the vending machine 2 as a function of the condition of the overall system, and (h) Provides access to the data record stored in the in-site data file 51 for supervisory personnel.

The operations of the microprocessor 40 proceed as dictated by a program stored permanently in its non-volatile read-only memory. The information necessary for one skilled in the art to program the microprocessor 40 will be clear from the description of its functions and operation, and the accompanying figures. The internal read/write memory of the microprocessor 40 is used to store operating variables such as cash total, credit values, and vend counters. Under certain conditions, this internally stored data file is transferred by the microprocessor 40 to the in-site data file 51. The microprocessor 40 also controls transfer of the data file from the in-site data file 51 to the portable data file module 52.

The operating program of the microprocessor 40 remains normally in a display control loop. The display control loop causes a sequential scan of the three digits of the display 81 by the display control 80 and transfers the proper BCD codes for each digit at the correct times during the scan, thereby displaying the user's current credit value. At the end of each pass through the display control loop, various flags are interrogated to determine the need to execute specific routines. The detection of a flag causes the microprocessor program to exit from the display loop and proceed to the correct service routine.

Vendor flag signals from the status latch circuit 36 advise the microprocessor 40 that more activity has occurred in the vending machine 2 or coin mechanism 1. The microprocessor 40 proceeds to analyze the signals from outputs A and B of the flip-flops 361 and 363 in the status latch circuit 36 to determine the correct actions to be taken. The following events may occur:

(a) Escrow Return (AB=10)

Storage locations of the microprocessor 40 for current credit and prior credit are cleared to zero. No change is made in the stored values for vend total or vend counters.

(b) Normal Vend (AB=11)

Credit data stored in the shift register 30 is read by the microprocessor 40 which transmits a series of shift pulses from its pin 33 to the clock logic and accepts the serial data appearing at the output of the shift register 30. This current credit data is subtracted by the microprocessor 40 from the prior credit data to determine the price at which the vend occurred. The price is added to the vend total data and the appropriate vend counter is incremented. Both current and prior credit values are now returned to a zero.

(c) Multi-vend (AB=01)

As in (b) above credit data is read in serially from the shift register 30 into the microprocessor 40. If this current credit value is less than the prior creidt value, the multi-vend mode is in effect. The difference between current and prior credit values defines the vend price which is added to the vend total and causes the appropriate vend counter to be incremented. The credit values are not set to zero. Instead, the prior credit value is set to the current credit value just read.

(d) Coin Acceptance (AB=01)

As in (c) above, credit data is read in serially from the shift register 30 into the microprocessor 40. If this current credit value is greater than the prior credit value, no vend has occurred. Instead, a new coin has been validated by the coin mechanism 1 and a new credit value has been established. No action is taken except to set the prior credit value equal to the current credit value just received.

At the conclusion of any of events (a)-(d) above, the flip-flops 361 and 362 in the Status Latch circuit 36 are reset and, if required, the new credit value is converted from its binary coding into the BCD coding needed for the display control circuit 80. The operating program returns to the display control mode until a flag is received from the status latch circuit 36.

The in-site data file 51 in this embodiment, shown in FIG. 4, is a non-volatile Electrically Alterable Read-only Memory (EAROM) which includes 100 locations each containing 14 bits of data (such as a General Instruments type No. ER1400). This type of memory may be written to or read from as with any semiconductor memory, but it retains stored data after power has been removed. Alternatively, a magnetic "bubble" memory can be used, or a low power consumption static RAM memory can be used in conjunction with a small power source, such as battery, to maintain the data files in case of power failure and, in the case of the portable data file module 52, removal from the accountabilty system 10. The in-site data file 51 is included as a permanent part of the electronics of the accountability system 10.

The data file locations in the in-site data file 51 may be elements of three different data sub-files described as:

(a) Cumulative, where the totals are accumulated on a continuous basis and spanning all previous vend intervals;

(b) Current, where the totals are accumulated during the present vend interval (from portable data file module insertion to portable data file module removal); and (c) Temporary, where the totals are accumulated during the current vend interval and stored temporarily during periods of power interruption.

A typical organization of the data files stored in the in-site data file 51 is as follows:

| Location | File Content |
|---|---|
| (a) Bookkeeping (12 locations) | |
| 1 | Machine ID (Acc't #, Serial #, Vendor #, etc.) |
| 2 & 3 | Total Vended Cash; Current Vending Interval |
| 4 & 5 | Total Vended Cash; Cumulative |
| 6 | Total insite data file Writes; Cumulative |
| 7 | Total portable data file module Writes |
| 8 | Total Power Interrupts (Current Vending Interval) |
| 9 | Test Vend Counter Total (Current Vending Interval) |
| 10 | Vended Cash - Power Interrupt Temporary Location |
| 11 | Insite data file Writes - Power Interrupt Temporary Location |
| 12 | Test Vends - Power Interrupt Temporary Location |
| (b) Price Counters (64 locations) | |
| 13 | Price #1 Value |
| 14 | Price #1 Counter - Power Interrupt Temporary Location |
| 15 | Price #1 Counter - Current Vending Interval |
| 16 | Price #1 Counter - Cumulative |
| 17–20 | Price #2 Counter 4 locations as for Price #1 |
| 21–24 | Price #3 Counter - 4 locations as for Price #1 |
| 25–28 | Price #4 Counter - 4 locations as for Price #1 |
| 29–32 | price #5 Counter - 4 locations as for Price #1 |
| 33–36 | Price #6 Counter - 4 locations as for Price #1 |
| 37–40 | Price #7 Counter - 4 locations as for Price #1 |
| 41–44 | Price #8 Counter - 4 locations as for Price #1 |
| 45–48 | Price #9 Counter - 4 locations as for Price #1 |
| 49–52 | Price #10 Counter - 4 locations as for Price #1 |
| 53–56 | Price #11 Counter - 4 locations as for Price #1 |
| 57–60 | Price #12 Counter - 4 locations as for Price #1 |

-continued

| Location | File Content |
|---|---|
| 61–64 | Price #13 Counter - 4 locations as for Price #1 |
| 65–68 | Price #14 Counter - 4 locations as for Price #1 |
| 69–72 | Price #15 Counter - 4 locations as for Price #1 |
| 73–76 | Price #16 Counter - 4 locations as for Price #1 |
| (c) Inactive Price Counter (24 locations) | |
| 77 | Inactive List - Price #1 Value |
| 78 | Inactive List - Price #1 Counter (Cumulative) |
| 79–80 | Inactive List - Price #2 (2 locations as for Price #1) |
| 81–82 | Inactive List - Price #3 (2 locations as for Price #1) |
| 83–84 | Inactive List - Price #4 (2 locations as for Price #1) |
| 85–86 | Inactive List - Price #5 (2 locations as for Price #1) |
| 87–88 | Inactive List - Price #6 (2 locations as for Price #1) |
| 89–90 | Inactive List - Price #7 (2 locations as for Price #1) |
| 91–92 | Inactive List - Price #8 (2 locations as for Price #1) |
| 93–94 | Inactive List - Price #9 (2 locations as for Price #1) |
| 95–96 | Inactive List - Price #10 (2 locations as for Price #1) |
| 97–98 | Inactive List - Price #11 (2 locations as for Price #1) |
| 99–100 | Inactive List - Price #12 (2 locations as for Price #1) |

As previously noted, storage locations are provided to maintain complete historical files for up to 16 different price values. Additional prices beyond the first 16 are accomodated in the active file by retiring from the cumulative file to an inactive file any price not occurring during the current vend interval. Up to 12 inactive price values may be included in the inactive file.

When the test/operate switch S17, shown in FIG. 2, is placed in the Operate position, vends are authorized and counted in the normal way, assuming the the portable data file module has been inserted correctly. If no portable data file module is inserted or if the portable data file module did not pass verification tests when inserted, the vending machine 2 is inhibited and no vends or coin acceptance can occur. The vending machine inhibit (VMI) signal, which performs this function, is described further in connection with FIG. 7 below.

The memory included in the portable file module 52 in this embodiment is the same type as that described for the in-site data file 51. Again, 100 locations of 14 bits each are included in the non-volatile EAROM of the portable data file module 52. Upon insertion of the portable data file module 52, the microprocessor 40 checks for special identification patterns stored in the portable data file module 52 at the central location. All locations of the memory are tested and, if correct, the values stored in all locations are set to zero and the machine identification (ID) number is read from the parallel input circuit 31 and is written in the Machine ID location in the portable data file module 52. Therefore, a new vend interval proceeds as described elsewhere in this application.

A special file location is included in the in-site data file 51 to record the total number of write cycles experienced by the EAROM memory. After a predetermined number of such erase/write cycles, the data file device 51 or 52 can be retired from service to avoid marginal operation. Similarly, the portable data file module 52 has stored in two locations the number of erase/write cycles both for its own memory device 521 and for the in-site data file 51 of the machine in which it was most recently installed.

FIG. 4 shows a number of the ports of the microprocessor 40, along with details of the high frequency clock 90, the data file interface 50, the in-site data file 51, and the portable data file module 52. Pins 21, 22, 23, 24, 35, 36 and 37 are ports of the microprocessor 40 associated with the data files 51 and 52 in this embodiment of our accountability system 10. The signals on leads 402, 403 and 404 are mode control signals for the C1, C2 and C3 inputs of the in-site data file 51 and the portable data file module 52. The functions associated with the C1, C2 and C3 inputs are:

| C1 | C2 | C3 | Function |
|---|---|---|---|
| 0 | 0 | 0 | Standby—contents of address and data register remain unchanged. Output buffer is left floating. |
| 0 | 1 | 1 | Accept Address—Data presented at the I/O pin 12 is shifted into the address register with each clock pulse. Addressing is by two consecutive one-of-ten codes. |
| 1 | 0 | 0 | Read—The address word is read from memory into the data register. |
| 1 | 0 | 1 | Shift Data Out—The output driver is inabled and the contents of the data register are shifted out one bit with each clock pulse. |
| 0 | 1 | 0 | Erase—The word stored at the addressed location is erased to all zeros. |
| 1 | 1 | 1 | Accept Data—The data register accepts serial data presented at the I/O pin 12. The address register remains unchanged. |
| 1 | 1 | 0 | Write—The word contained in the data register is written into the location designated by the address register. |
| 0 | 0 | 1 | Not Used. |

The mode control signals on wires 402, 403 and 404 are buffered by the amplifier circuits including transistors Q7, Q8 and Q17, respectively. Since the ports at pins 21 and 22 of the microprocessor 40 are dual purpose ports, the program store enable $\overline{PSEN}$ signal from pin 9 of the microprocessor 40 is buffered by the transistor Q16 amplifier and the diodes to the collectors of transistors Q7 and Q8 to disable the Cl and C2 inputs except when an access to one of the data files is intended.

Wire 501 is a bi-directional serial data line to and from the data files 51 & 52. Data from the microprocessor 40 to the data files 51 & 52 is received by wire 501 from pin 35 of the microprocessor 40, wire 406 and transistor Q19. Data transmitted from a data file 51 or 52 to the microprocessor 40 is transmitted via transistor Q18, wire 407 and pin 36 of the microprocessor 40.

Pins 24 and 37 of the microprocessor 40 supply the signals to wires 405 and 408 which ultimately select either the in-site data file 51 or the portable data file module 52, respectively. The signal on wire 405 or 408 gates clock pulses from the 14 kHz clock 90 through the corresponding AND gate 505 or 508 to the corresponding transistor Q20 or Q21. The clock pulses are then transmitted to the clock input at pin 6 of the in-site data file 51 or the portable data file module 52, thus enabling the selected data file. The clock 90 is of conventional design, incorporating a National Semiconductor type No. 555 clock circuit 91. The clock 90 also supplies its 14 kHz clock signal to pin 1, the T0 input of the microprocessor 40. A 25 Hz clock signal is supplied to the T1 input at pin 39 of the microprocessor 40 by the a Schmidt trigger circuit 95.

When the test/operate switch S17, shown in FIG. 2, is placed in the Operate position, vends are authorized and counted in the normal way, assuming the the portable data file module 52 has been inserted correctly. If no portable data file module 52 is inserted or if the portable data file module did not pass verification tests when inserted, the vending machine 2 inhibited by the VMI signal on line 250 and no vends or coin acceptance can occur.

When the test/operate switch S17 is placed in the Test position, three special effects result:

(a) If the vending machine inhibit line 250 is active, it is interrupted and the vending machine is permitted to accept coins and perform vends.

(b) The microprocessor 40 maintains a special counter to record the total number of vends which occur during the period that the switch is in the Test position.

(c) The red indicator 62 is caused to flash to warn the operator that the system should not be left with the switch in the Test position.

The test/operate switch S17 is provided to allow the operator to vend product and test the operation of the vendor without affecting the totals stored in the portable data file module 52. A counter, in the microprocessor 40, records the total number of vends occurring in the Test mode to discourage any efforts to cheat or defeat the normal operation of the accountability system, and this information is transferred to the data files 51 and 52. Also, in the event that a failure occurs in the electronics of the accountability system 10, the operator may still effect normal operation of the vending machine 20. Insertion or removal of the portable data file module 52 is not permitted with the test/operate switch in the Test position.

Figure 6:
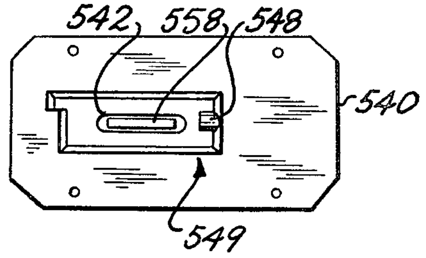
FIG. 6 is a front elevation of the receptacle of FIG. 5.
Figure 5:
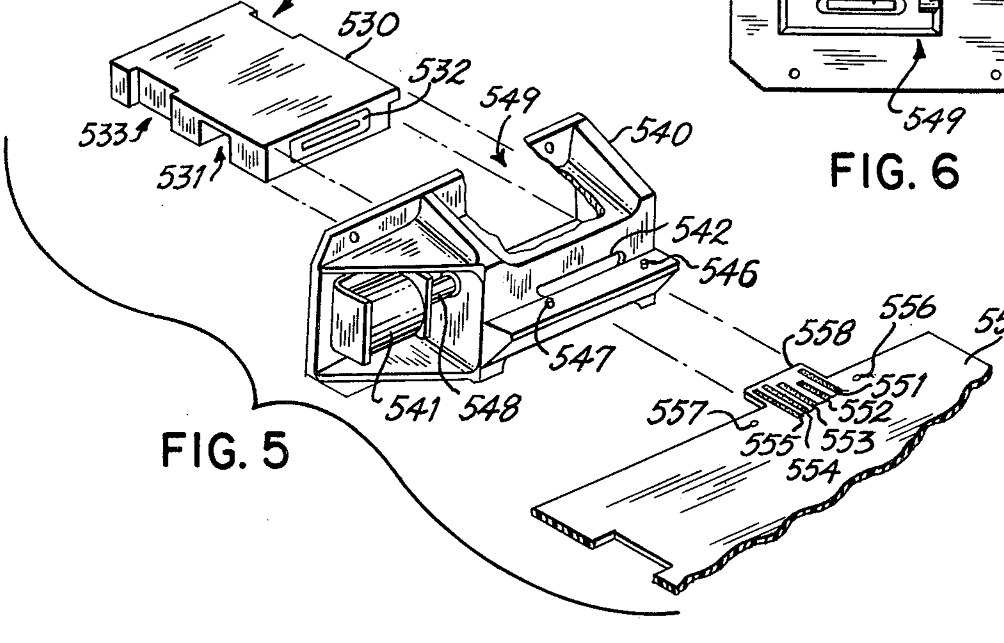
FIG. 5 is an exploded, isometric view of a portable data file module and means, including a receptacle, for connecting the portable data file to the rest of a accountability system, which is suitable for the embodiment of FIG. 1.

FIG. 5 illustratively shows an exploded view of a portable data file module 534, a module receptacle 540 and a portion of the printed circuit board 550 with which the module 534 connects. FIG. 6 shows a portion of the receptacle where the module is inserted and the latch pin 548. The printed circuit bound 550 is secured to the receptacle 540 by locating pins 546 and 547 which protrude into holes 556 and 557. When the board is thus located, its tongue 558 protrudes through the opening 542 into the receptacle 540.

As the module 530 is inserted into the receptable, the female connected on the module sequentially engaged the contacts 551–555 on the tongue 558 of the printed circuit board; first engaging the longest contacts 551, 554 & 555, then the medium length contact 553 and finally the shortest contact 552. This technique permits the operation of certain electrical interlock circuits to assure that the module 530 is completely connected to the circuits on the circuit board 550 before the accountability system 10 can be operated with the module. In the portable data file module 51 of FIG. 4, power supply contacts 4 and D would be the longest, the contact 3 which is connected to the inhibit line 523 would be shortest, and the remaining contacts would be of medium length.

The module 530 shown in FIG. 5 is provided with three recesses in its sides. Two of these recesses 533 & 534 are provided to assists in gripping the module 530.

The other recess 531 is provided to be engaged by the armature of the solenoid 541 when the module 530 is fully inserted into the receptale 540. When the solenoid 541 is not activated and no module 530 is in the receptacle 540, the solenoid protrudes into the receptacle 540, preventing the insertion of a module 530. Only when the solenoid 541 is actuated is the armature 548 withdrawn and a module 530 can be inserted in or removed from the receptacle 540.

The route operator may insert or remove the portable data file module 52 only if authorized by the microprocessor 40. The insert/remove flag is generated with each depression of the insert/removal switch S20. This flag advises the microprocessor 40 that the portable data file module 52 already in operation is to be removed or that a new portable data file module 52 is to be inserted, and causes the microprocessor 40 to update and transfer the contents of the in-site data file to the module.

Upon completion of the data transfer, removal of the portable data file module 52 is authorized by the microprocessor 40 and the portable data file module 52 can be returned to a central office for read-out, analysis, and recording of the contents of its data files. As shown in FIG. 5, the removal authorization signal is transmitted from pin 33 of the microprocessor 40 via an inverter and transistor Q14 to switch transistor Q15, activating the VMI line 250. The VMI line is also activated whenever the portable data file module 52 has ben removed, as a result of the removal of ground potential from inhibit line 552. The microprocessor 40 controls the solenoid latch 61 by concurrent signals on its output pins 14 and 15. (Pins 12–19 of the microprocessor 40 are also used to control the display 81 via display control circuit 80). The solenoid control signal is amplified by the solenoid driver 611, a Darlington amplifier type No. 2N6039, which permits current to flow from wire 756 through the solenoid 61 to ground.

A request for removal of the portable data file module 52 causes the microprocessor 40 to update all files in the in-site data file 51 and to transfer the complete 100 location file to the portable data file module 52. Thereafter, the cumulative file of in-site data file 51 is updated by addition of the totals for the current vend period and the values stored in current data file are returned to all zero values in preparation for the next vend interval.

(a) Removal

- The data file stored in the In-site Memory 51 is updated.
- The proper portions of the data file locations in the in-site data file 51 are transferred to the portable data file module 52.
- The solenoid actuated latch 61 is activated allowing the portable data file module to be removed.
- The red indicator 62 is lit (by concurrent signals on pins 12 and 13 of the microprocessor 40) advising the operator that the portable data file module may be removed. (Note: The latch 61 will remain activated until the portable data file module is removed or until 30 seconds have passed during which the portable data file module was not removed).
- If the portable data file module is removed, the latch 61 is deactivated, the red indicator 62 begins to flash, and a special inhibit signal is generated by the microprocessor 40 and transmitted from its pin 33 to disable coin acceptance or vend authorization in the vending machine 2.
- If the portable data file module is not removed, the microprocessor 40 deactivates the latch 61 after 30 seconds and returns to normal operation. The red indicator 62 is extinguished when the latch 61 releases.

(b) Insertion

- The Insert/Remove flag is recognized and the portable data file module latch is activated. The red indicator 62 flashing up to this time, now lights steadily to advise the operator that the portable data file module 52 may be inserted.
- If the portable data file module is not inserted before 30 seconds has elapsed, the portable data file module latch 61 is deactivated and the system reverts to its previous state. (Red indicator 62 flashing and vending machine disabled).
- If the portable data file module is inserted, the microprocessor 40 performs a complete test of its contents. A fresh portable data file module supplied by the central accounting office will have specially coded data and test patterns stored in its memory.
- If the portable data file module test is successful, the microprocessor 40 releases the latch 61, thus locking the new portable data file module 52 in place. The red indicator 62 is extinguished and the vendor inhibit is removed. The microprocessor 40 transfers certain initializing data to storage locations in the new portable data file module and returns to normal system operation.
- If the tests performed on the new portable data file module 52 are not successful, the latch 61 is deactivated, and the red indicator 62 begins flashing to advise the operator that the new portable data file module 52 is not correct and must be removed and replaced. The vending machine inhibit signal on line 250 is not removed.

Interruptions of primary power (deliberate or accidental) cannot be permitted to affect the recording of correct accountability data by the system. A power monitor 71 is included in the system 10 to detect an imminent loss of primary power. A signal is provided on line 742 to pin 6 the microprocessor 40 to indicate this condition.

Figure 8:
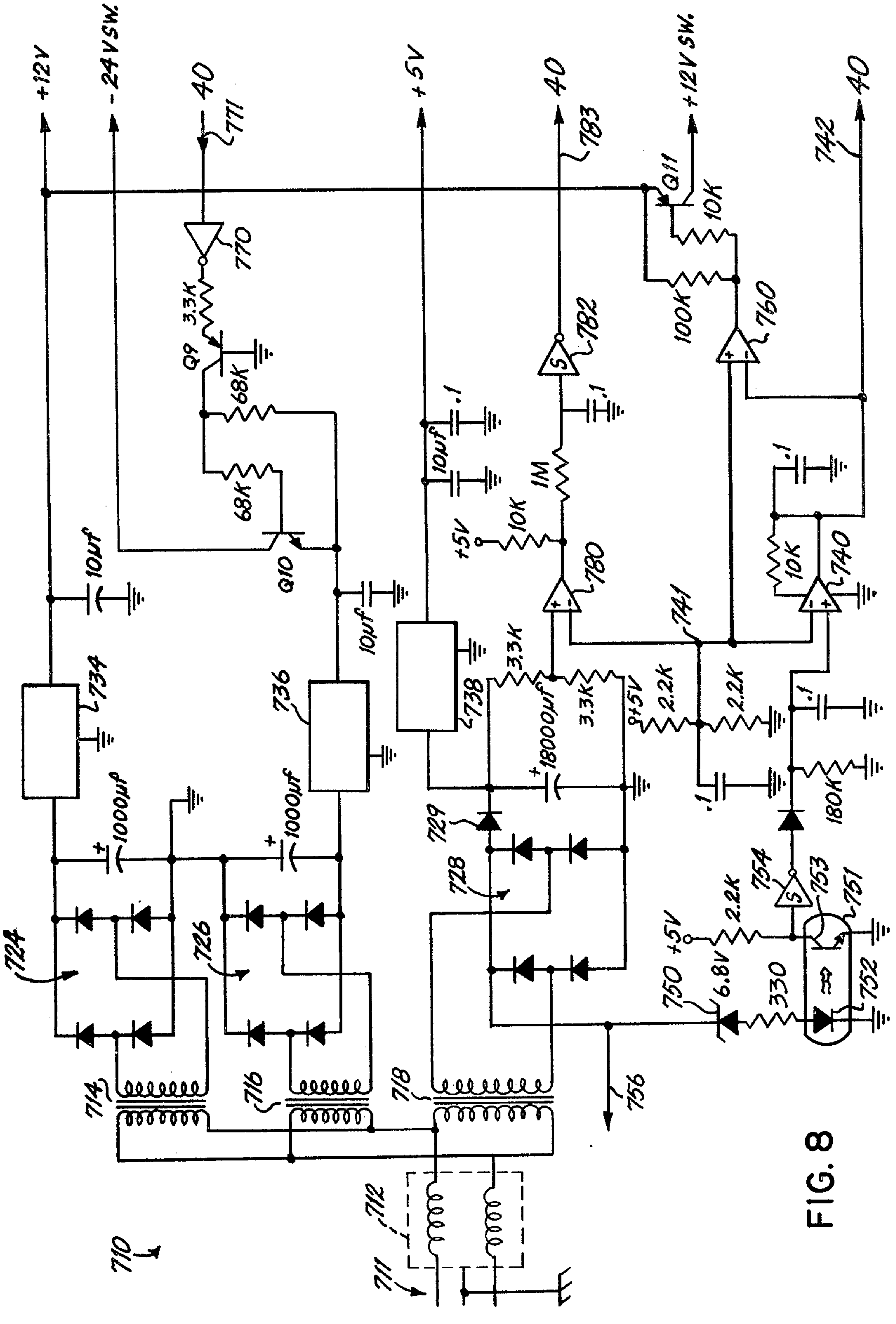
FIG. 8 is a schematic block diagram of a power supply and a power monitor suitable for the embodiment of FIG. 1.

FIG. 8 shows a combined power supply and monitor circuit 710, corresponding to the power supply 70 and the power monitor 71 of FIG. 1. The power circuit 710 receives alternating current from the means via wires 711. A conventional inductive filter 712 reduces pulse and radio frequency interference. Transformers 714, 716 & 718 convert the voltage of the main power to the voltage required for the various DC power supplies. The transformer outputs are connected to full-wave bridge recifiers 724, 726 & 728 respectively.

The first power supply includes transformer 714, bridge rectifier 724, a 1000 ufd filter capacitor and a voltage regulator which produces a +12 volt output.

The second power supply includes transformer 716, bridge rectifier 726, a 1000 ufd filter capaictor and regulator 736 which produces a −24 volt output for the switching circuit including transistors Q9 and Q10.

The third power supply includes transformer 718 bridge rectifier 728, diode 729, and an RC filter comprising a large 18000 ufd capacitor and two 3.3 K resistors in series. The time constant of this power supply assures that it will provide DC power for sufficient time after an AC power outage for the microprocessor 40 to complete the tasks necessary to prevent loss of data.

The third power supply also includes a voltage regulator 738 which produces the +5 volt input.

Comparator 740 is connected to compare the approximately 2.5 volts DC from wire 741 at its negative input which the signal at its other input which is controlled by the presence of AC power at the input to the zener dioide 750. The zener diode 750 permits a small current to flow through the light emitting diode section 752 of an optical compler 751 whenever the AC power is on. This causes the phototransistor section 753 of the optical compler 751 to present a relatively high impedance between the input to the inverter 754 and ground, so that a voltage higher than 2.5 volts appears at the positive input of the comparator 740. When the AC power is turned off, the impedance to ground of the phototransistor section 753 becomes low, causing the voltage at the positive input to the comparator 740 to drop below that at the other input. As a result, the comparator 740 output signal level from high to low. This causes the microprocessor 40 to switch to an interrupt mode.

The output of comparator 740 also controls the +12 volt switched output of the power supply by controlling comparator 760 and transistor Q11. When the comparator 740 determines that there has been an AC power failure, Q11 is caused to turn off the +12 volt switched output.

When the microprocessor 40 has completed its interrupt mode tasks following the interrupt signal, it produces the −24 V interrupt signal at its pin 29. This signal is transmitted to inverter 770 and the switching circuit incorporating transistors Q9 and Q10, causing transistor Q10 to switch off the −24 volt output of the power supply. As a result of the discontinuance of the 31 24 volt, which ordinarily powers the data files 51 and 52, the contents of the data files cannot be changed until the power monitor 71 determines that power has been fully restored. When power is restored, comparator 780 sends a signal via inverter 782 and wire 783 to the RESET input of the microprocessor 40.

In the interrupt mode, the microprocessor 40 completes its current operation and proceeds immediately to update the date file stored in the in-site data file 51. This total operation will be completed in less than 0.5 seconds during which time the source of DC power to the electronics will remain stable. Thereafter, the electronics will become inactive and the correct data will have been stored in the non-volatile EAROM of the in-site data file 51.

Upon restoration of primary power, the microprocessor 40 is reset by the signal on wire 783 from the power monitor. The microprocessor 40 will perform an initializing routine which checks the configuration of the system (portable data file module correctly inserted, etc.) and continues the recording of data from the point that existed just prior to power interruption. A special counter is included in the data files 51 and 52 to record the total number of power interruptions occurring during the reporting period.

Figure 9:
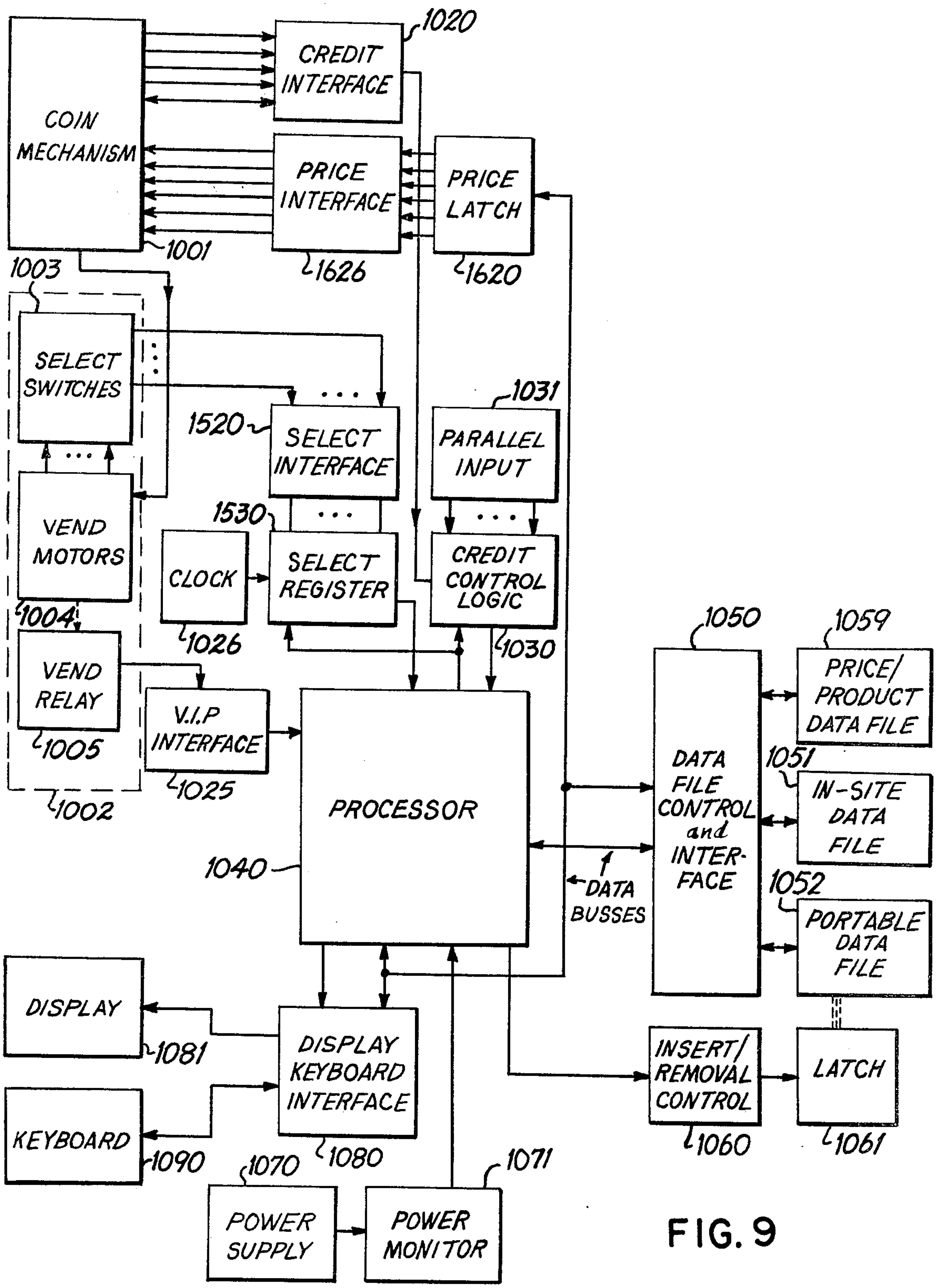
FIG. 9 is a schematic block diagram of a second embodiment of our invention.

FIG. 9 is a block diagram of a second embodiment of my invention which includes the cash accountability and credit display features of the first embodiment, and additional features of price setting and inventory control. In this embodiment, the accountability system 1000 receives product selection requests from the product selection switches 1003 in the vending machine or system 1002, determines the proper price for that selection by referencing a price/product memory 1059, and routes the proper price data to the coin mechanism 1001, such as a MARS Electronic (trademark) Model 604 coin mechanism. The select interface 1520 of this embodiment can individually monitor each selection switch of the vending machine 1002. At present, a large vending machine may include up to 55 product delivery columns with each containing a different product and with each set at any of 63 prices between 5 cents and $3.15. With the accountablity system 1000 in accordance with this embodiment of our invention, a record can be kept of the number of vends for each column, the price set for that column, and the coded data defining the specific product loaded in that column.

To permit a continuous display of the value of accumulated credit stored by the coin mechanism 1001, the control logic circuits comprising the clock logic 26, status latch circuit 36 and shift register 30, described for the first embodiment are substantially duplicated in the control logic 1030 of this embodiment. FIG. 9 shows the five interface signals from the coin mechanism buffered at the credit interface 1020, in similar fashion to interface 20 of the first embodiment, and transferred to the credit control logic 1030 for processing and interface with the microprocessor 1040.

Operation of the credit control logic 1030 in accountability system 1010 of this embodiment is as described for the first embodiment. Processing of the machine ID number data from the parallel input 1031 is similar to that of the first embodiment.

Logic is included in accountability system 1010 to allow product selection requests to be detected and identified. The select interface circuit 1520 receives input signals in parallel from each of the selection switches 1003 in the vending machine 1002. A select register 1530 periodically interrogates the select interface 1520 and stores the data appearing at its output. The contents of the select register 1530 are serially shifted to the microprocessor 1040, by the microprocessor 1040, which detects and identifies which of any of the product select switches 1003 has been actuated by the user.

Price latch 1625 and price interface 1620 circuits are included to store and transfer the correct price data to the coin mechanism 1001.

The vend-in-progress (blocker) signal provided by the vending system 1002 on wire 1024 via the vend-in process interface 1025, is monitored by the microprocessor 40 to detect the actual occurrance of vending of the product selected.

Three data files are included in the electronics of the second embodiment. An EAROM data file 1052, like the portable data file 52 described in the first embodiment, is included in the second embodiment. It provides non-volatile storage for data defining the operation of the vending system. Data stored in accordance with the second embodiment includes the serial number of the vending system, the total cash value of all vends, the total vends for each vending column, and the price setting and product code for each column. Insertion and removal of the portable data file module 1052 is as described in the first embodiment. Data file interface and control logic 1050 is included to allow data transfers between the portable data file module 1052 and the microprocessor 1040. An in-site data file 1051, corresponding to the in-site data file 51 of the first embodiment, is also provided.

A third EAROM price/product data file 1059 is included in this embodiment to allow non-volatile storage of the prices and product code data from each vending column of the vending machine 1002. It is this price/-product data file 1059 which is accessed by the microprocessor 1040 to determine the correct price data for each vending column when a product selection is made.

A keyboard 1090 is included in this embodiment to permit route personnel personnel to inspect or modify the price settings or product codes for each column of the vending system. Price and product code data is stored in the price/product memory 1059 by the microprocessor 1040 which receives the data to be loaded from the keyboard 1090 operated by route personnel when the vending machine is serviced. A display 1081 is also provided. It performs the dual functions of credit display during normal operation and price/product-/column display during the machine servicing activities. Interrogation of the keyboard 1059 and updating of the display 1081 are controlled by the microprocessor 1040 using suitable display/keyboard interface logic 1080 to control these operations. This embodiment also incorporates an insert/removal control 1060, a latch 61, a power supply 1070 and a power monitor 1071, which have substantially the same structure and function as the corresponding elements of the first embodiment.

The central control element for the accountability system 1010 of this embodiment is an inexpensive microprocessor 1040 which performs the functions performed by the microprocessor 40 of the first embodiment and following functions:

(a) Monitors coin mechanism credit value and controls credit display.

(b) Monitors product select switches and provides correct price data to coin mechanism.

(c) Maintains a data file of total cash vending, total vends per folumn, price for each column, and product code for each column.

(d) Updates portable data file module stored data to removal by route personnel. Controls removal and insertion of portable data file module's and (e) Controls inputting and storage of price/product data form the keyboard and displays data to route personnel during vending machine service.

We claim:

1. An accountability system for a vending machine having means for vending products, means for crediting the value of deposited monies, means for comparing the credit with the price of the product for determining the sufficiency of the credit and any excess of credit, and means for dispensing change equal to any excess of credit; the accountability system comprising digital data processor means for collecting transaction data, an in-site data file for storing the transaction data, an exchangeable, portable data file module for recording the transaction data stored in the in-site data file, means for updating the data in the portable data file module prior to removal and exchange of the module, means for recording an identification of the particular vending machine in the portable data file module, means to inhibit operation of the vending machine in the absence of a portable data file module, and means to lock the portable data file module in place in the vending machine, the lock means being controlled by the data processor.

2. The accountability system of claim 1 wherein the transaction data includes product selection data from the vending means and credit data from the credit determining means.

3. The accountability system of claim 2 wherein the accountability system receives both credit data and product selection data from the credit determining means.

4. The accountability system of claim 2 wherein the accountability system functions as an interface between the credit determining means and the vending means.

5. The accountability system of claim 1 further comprising a data file correlating price and product data.

6. An accountability system according to claim 1 further comprising a power supply including a short term power reserve, and a power monitor for indicating a failure of mains power, wherein the processor is connected to update a data file during the period after the mains power fails and before the short term power reserve is consumed.

* * * * *

UNITED STATES PATENT AND TRADEMARK OFFICE

CERTIFICATE OF CORRECTION

PATENT NO. : 4,272,757

DATED : June 9, 1981

INVENTOR(S) : Donald L. McLaughlin & Elwood E. Barnes

It is certified that error appears in the above—identified patent and that said Letters Patent is hereby corrected as shown below:

Col. 3, line 4, delete "a" (second occurrence).

line 9, change "provides" to --provide--.

line 28, change "the" to --The--.

line 67, change "assumulator" to --accumulator--.

line 68, after "price" insert --of--.

Col. 6, line 6, after "specific" insert --service--.

line 11, change "more" to --some--.

line 40, change "creidt" to --credit--.

Col. 7, line 7, after "as" insert --a--.

Col. 8, line 51, after "portable" insert --data--.

Col. 9, line 30, change "inabled" to --enabled--.

UNITED STATES PATENT AND TRADEMARK OFFICE

CERTIFICATE OF CORRECTION

PATENT NO. : 4,272,757

DATED : June 9, 1981

INVENTOR(S) : Donald L. McLaughlin & Elwood E. Barnes

It is certified that error appears in the above—identified patent and that said Letters Patent is hereby corrected as shown below:

Col. 10, line 3, delete "the" (second occurrence).

line 46, change "bound" to --board--.

line 68, change "assists" to --assist--.

Col. 11, line 3, change "receptale" to --receptacle--.

line 29, change "ben" to --been--.

line 41, change "100" to --one hundred--.

Col. 12, line 54, change "recifiers" to --rectifiers--.

line 59, change "capaictor" to --capacitor--.

Col. 13, line 5, change "which" , first occurrence to -- with --.

line 7, change "dioide" to --diode--.

line 9, change "compler" to --coupler--.

line 11, change "compler" to --coupler--.

line 19, after "level" insert --shifts--.

line 34, change "31 24" to -- -24 --.

Col. 15, line 6, delete "personnel" (second occurrence).

line 28, after "and" insert --the--.

line 34, change "folumn" to --column--.

UNITED STATES PATENT AND TRADEMARK OFFICE

CERTIFICATE OF CORRECTION

PATENT NO. : 4,272,757

DATED : June 9, 1981

INVENTOR(S) : Donald L. McLaughlin & Elwood E. Barnes

It is certified that error appears in the above—identified patent and that said Letters Patent is hereby corrected as shown below:

Col. 15, line 38, change "module's" to --modules--.

line 40, change "form" to --from--.

Signed and Sealed this

*Twenty-second* Day of *December 1981*

[SEAL]

*Attest:*

GERALD J. MOSSINGHOFF

*Attesting Officer* — *Commissioner of Patents and Trademarks*